UNITED STATES PATENT OFFICE.

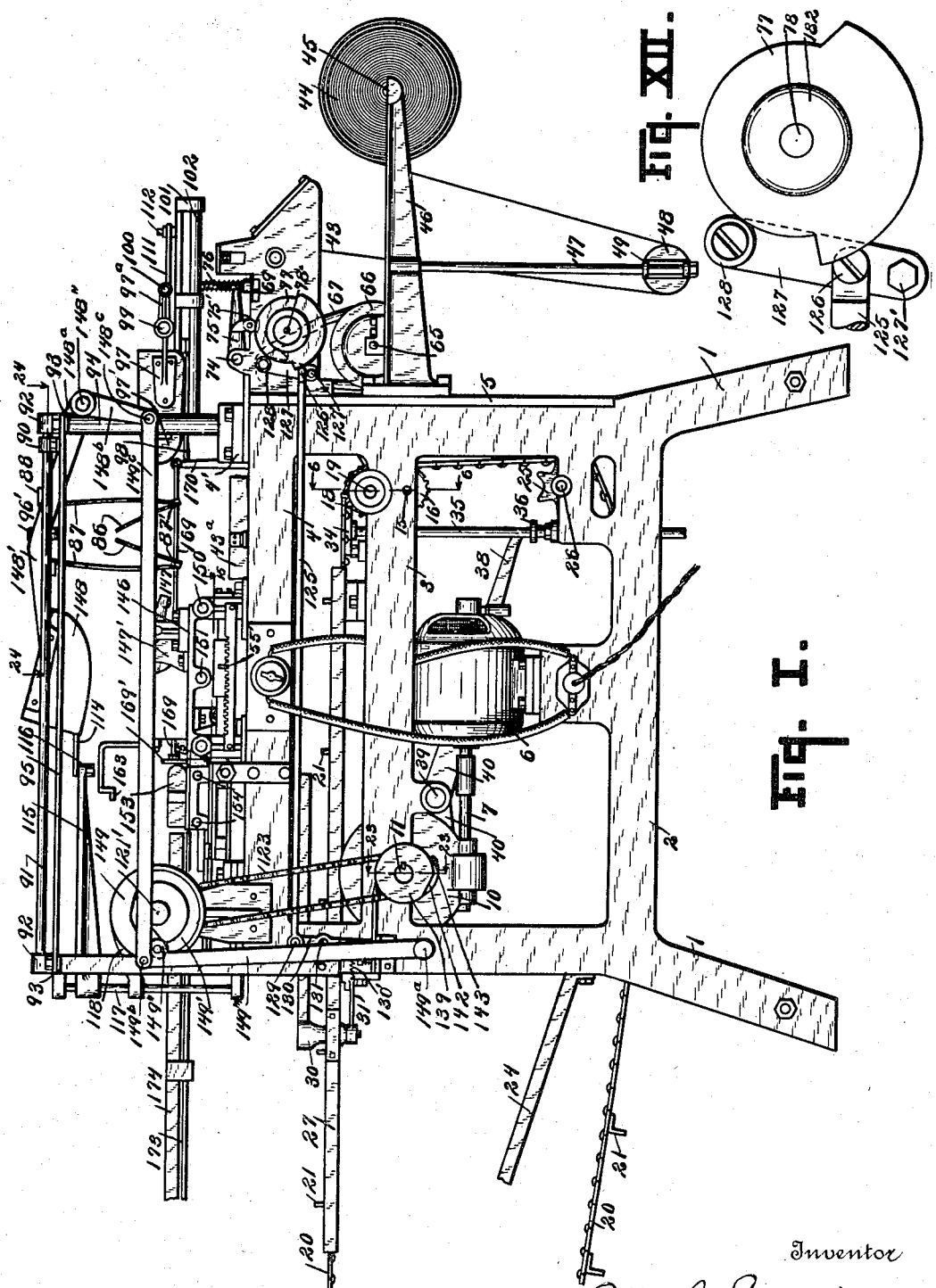

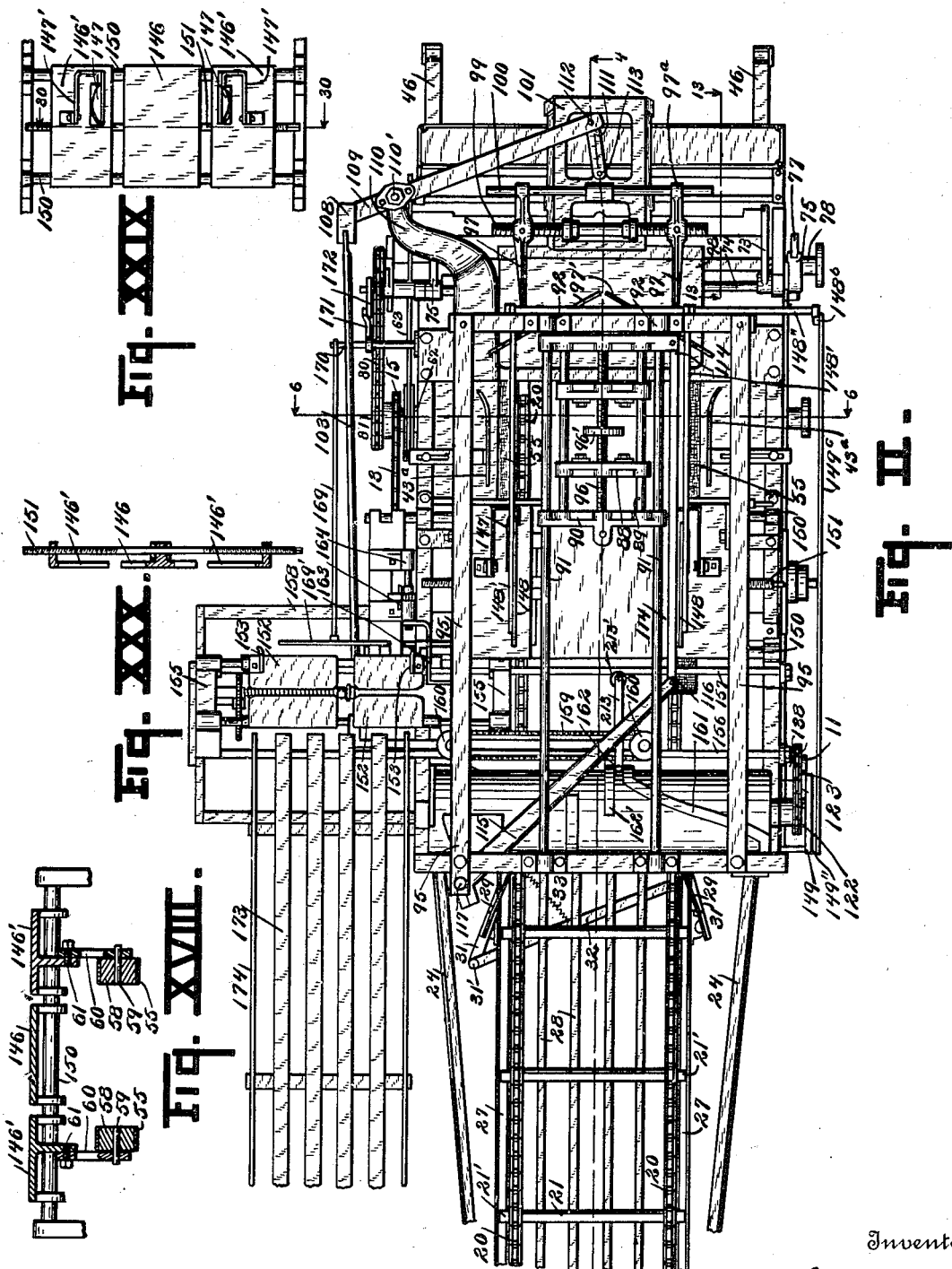

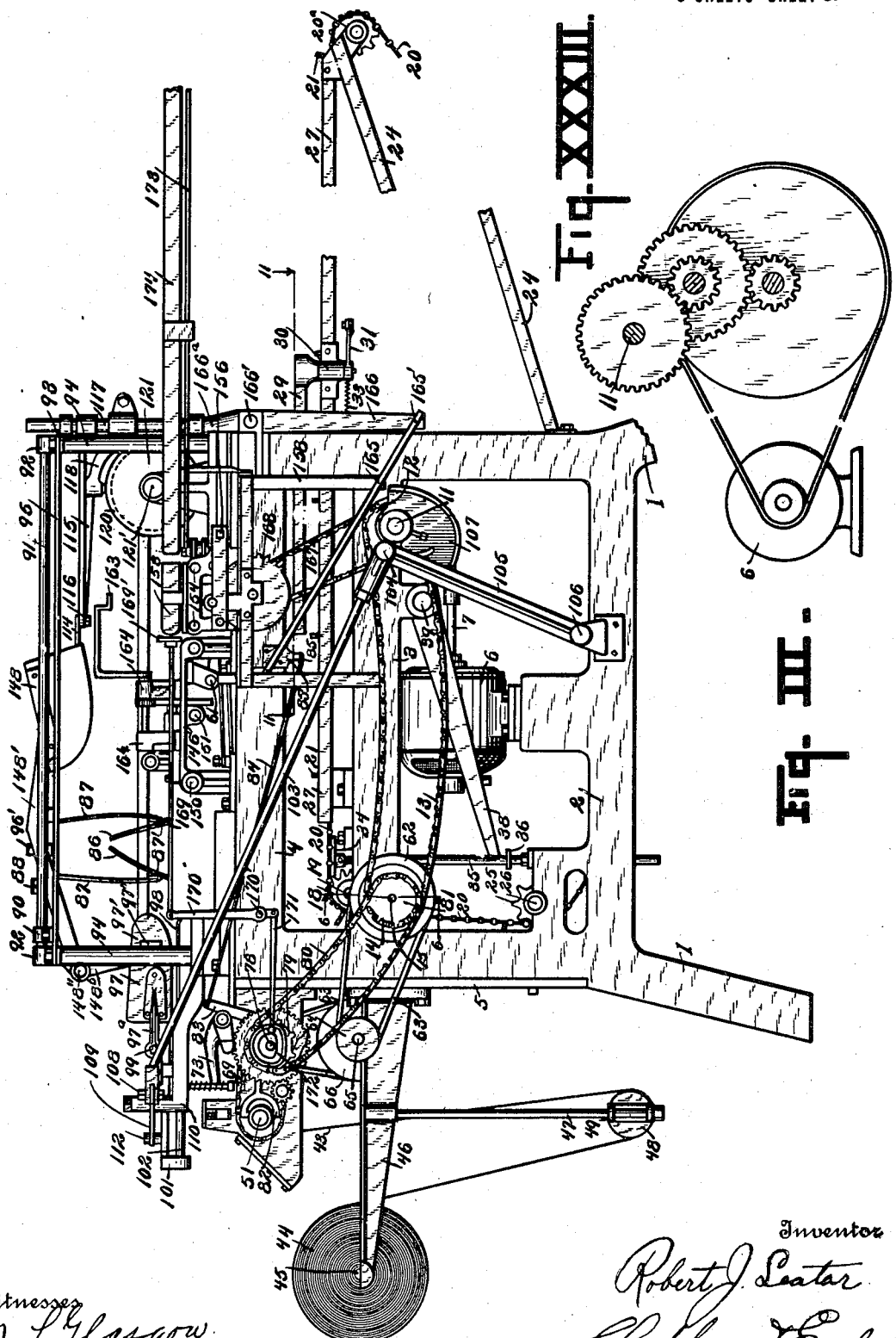

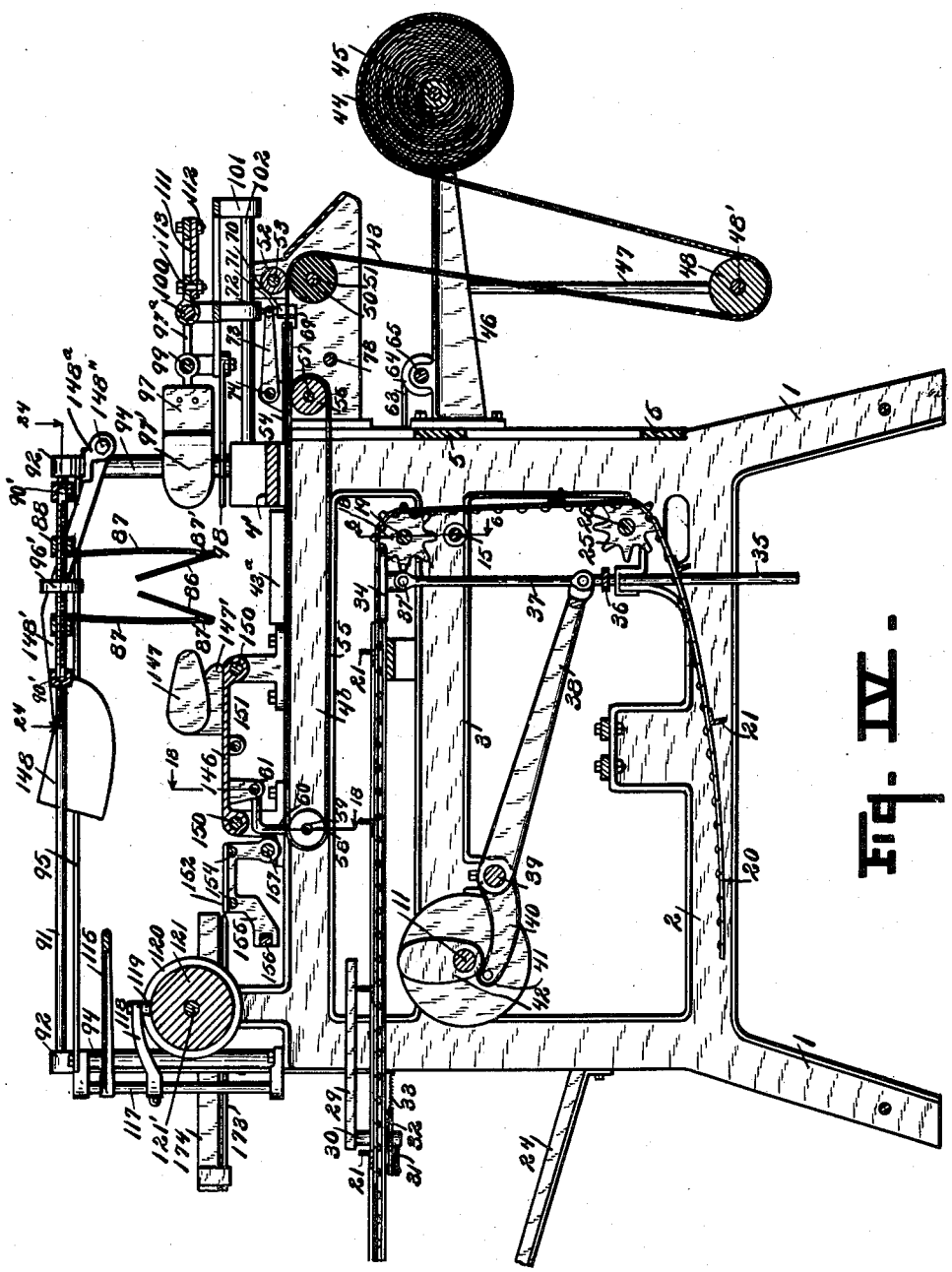

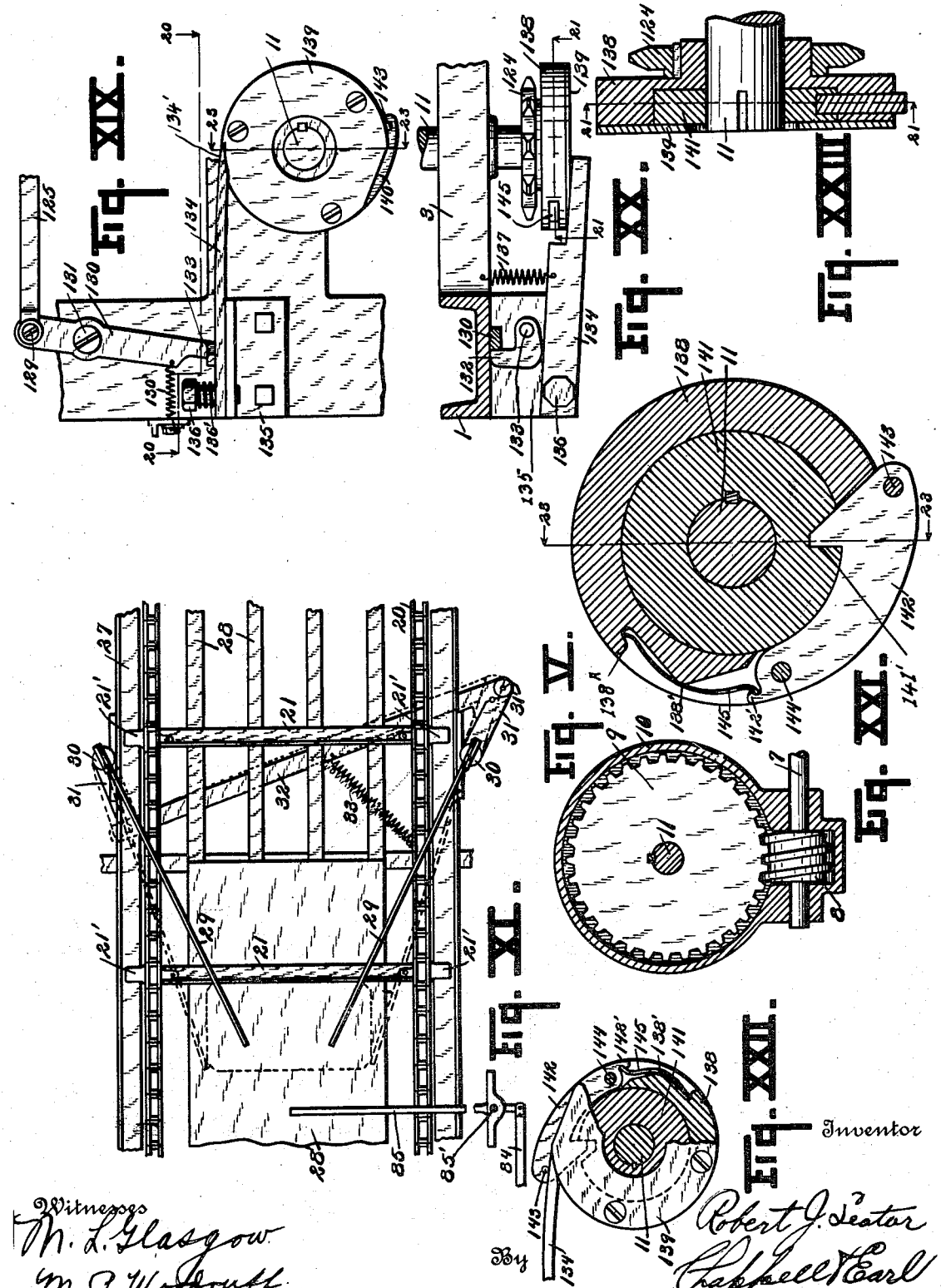

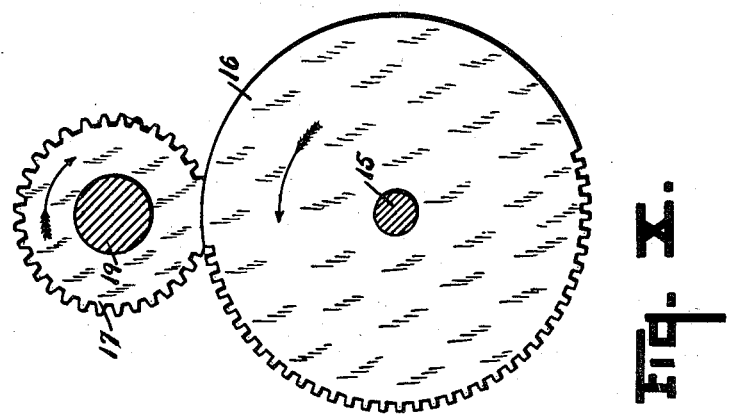
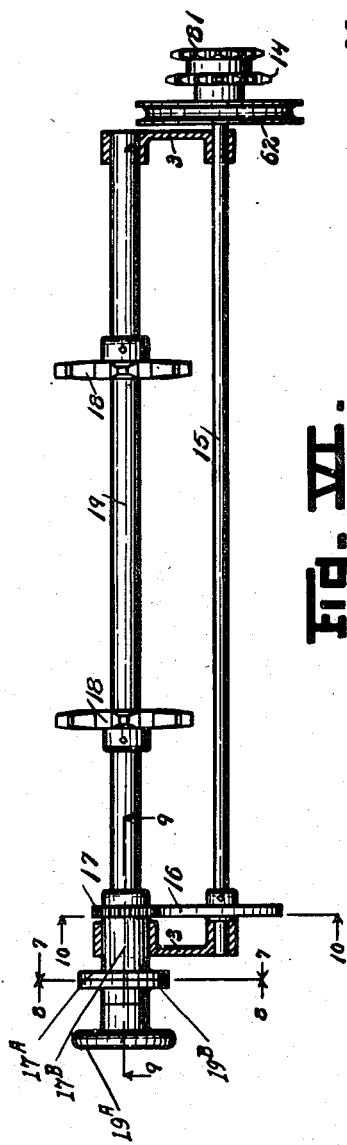
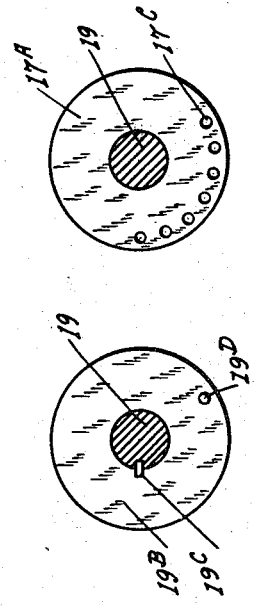
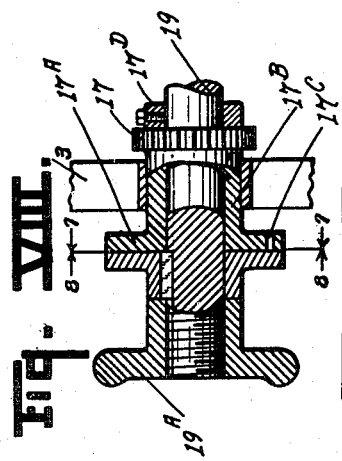
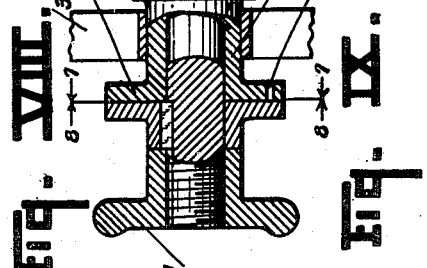

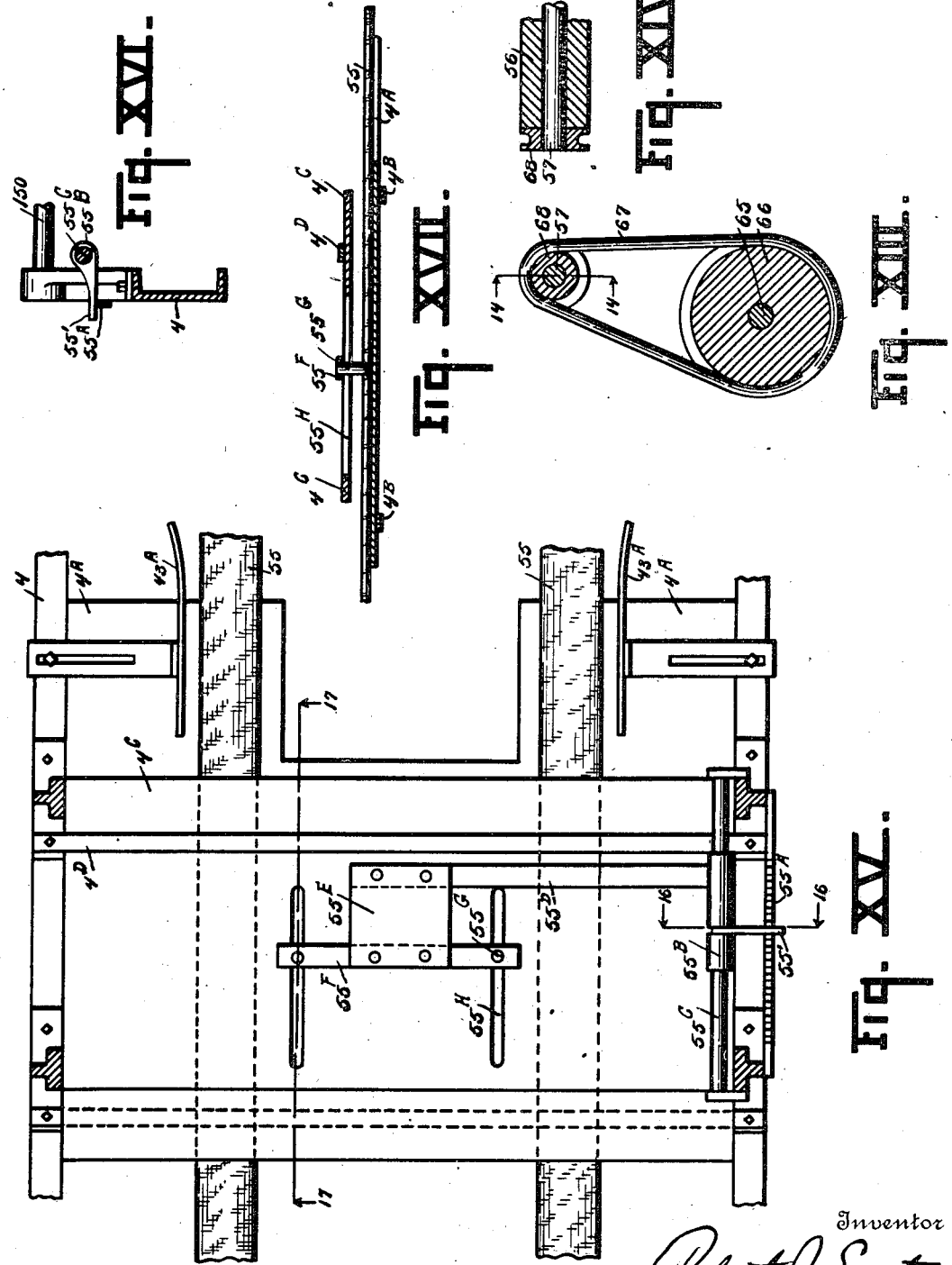

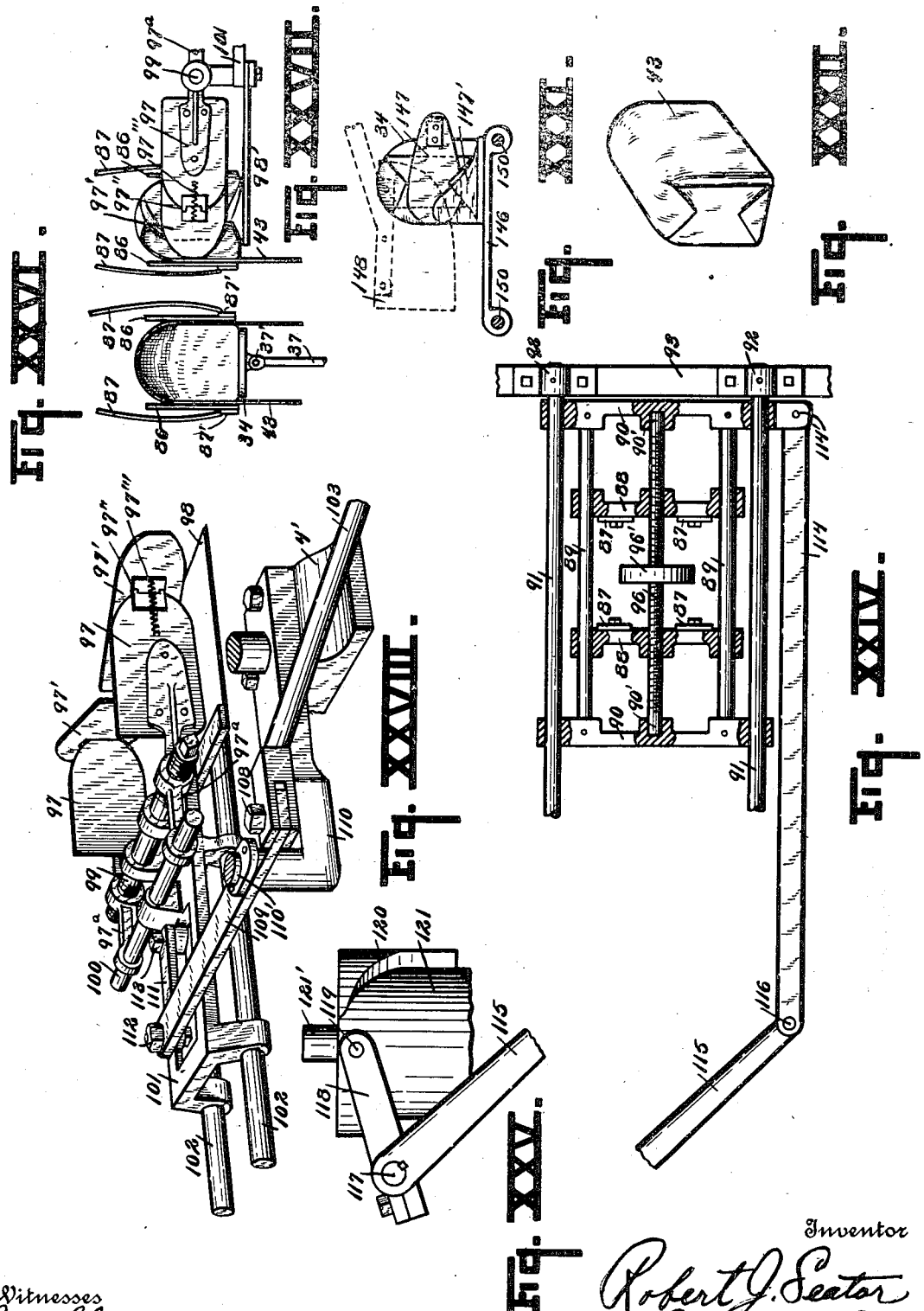

ROBERT J. SEATOR, OF BATTLE CREEK, MICHIGAN, ASSIGNOR TO SEATOR MACHINE MFG. COMPANY, OF BATTLE CREEK, MICHIGAN, A CORPORATION OF MICHIGAN.

BREAD-WRAPPING MACHINE AND MACHINE FOR SIMILAR PURPOSES.

1,140,620.   Specification of Letters Patent.   Patented May 25, 1915.

Application filed July 26, 1913. Serial No. 781,303.

*To all whom it may concern:*

Be it known that I, ROBERT J. SEATOR, a citizen of the United States, residing at 303 Lake avenue, Battle Creek, Michigan, have invented certain new and useful Improvements in Bread-Wrapping Machines and Machines for Similar Purposes, of which the following is a specification.

This invention relates to improvements in bread wrapping machines, and machines for similar purposes.

The objects of the invention are: First, to provide a compact simple bread wrapping machine which effectively envelops the loaf in a wrapper and ties or secures it in place. Second, to provide an improved means of feeding the loaf into the machine. Third, to provide improved gear shift means adapted to be actuated by the feeding of the loaf into the machine. Fourth, to provide such gear shift means in conjunction with automatic stop means for controlling the machine. Fifth, to provide improved folding means for enveloping the bread with the wrapper. Sixth, to provide improved folders and an improved arrangement of the same. Seventh, to provide automatic feed and cut-off means for feeding paper or other wrapper into the machine. Eighth, to provide improved means of retaining and supporting the paper or wrapper in a bread wrapping machine. Ninth, to provide improved automatic means for tying and discharging a loaf from the bread wrapping machine.

Improvements relating to details and economies of construction and operation will definitely appear from the detailed description to follow.

I accomplish the objects of my invention by the devices and means described in the following specification.

The invention is clearly defined and pointed out in the claims.

A structure which is a preferred embodiment of my invention is fully illustrated in the accompanying drawing, forming a part of this specification, in which:

Figure I is a detail elevation view from the right hand side of my improved machine, the loaf feeding carrier and support being in broken sections. Fig. II is a detail plan view of the machine on a somewhat reduced scale. Fig. III is a detail elevation view of the machine from the left hand side, the loaf feeding carrier and its support being shown in broken sections. Fig. IV is a detail longitudinal sectional elevation view taken on line 4—4 of Fig. II, certain of the parts being omitted for clearness. Fig. V is an enlarged detail vertical longitudinal sectional view of the worm gear drive for my improved machine. Fig. VI is an enlarged transverse detail vertical sectional view on line 6—6 of Figs. I, II, III and IV, showing the intermittent gear means for driving the loaf feeding carrier. Fig. VII is an enlarged detail sectional view on line 7—7 of Figs. VI and IX. Fig. VIII is an enlarged detail sectional view on line 8—8 of Figs. VI and IX. Fig. IX is an enlarged detail view, partially in section, on line 9—9 of Fig. VI. Fig. X is an enlarged detail sectional view of the intermittent gear taken on line 10—10 of Fig. VI. Fig. XI is an enlarged detail plan view of a portion of the loaf feeding carrier and guiding means, and the clutch trip disposed to be controlled by the loaf. Fig. XII is an enlarged detail end elevation view of the cam trip for controlling the clutch for the folder and knotter mechanism. Fig. XIII is a detail sectional view on line 13—13 of Fig. II, showing the belt drive for the paper feed carrier. Fig. XIV is a detail longitudinal sectional view on line 14—14 of Fig. XIII, showing the pulley and paper feed roll. Fig. XV is an enlarged detail sectional plan view of the paper guide and stop and adjusting means. Fig. XVI is a detail sectional view on line 16—16 of Fig. XV, of the stop adjusting means. Fig. XVII is a detail sectional view on line 17—17 of Fig. XV, showing details of the paper guide and stop. Fig. XVIII is a detail sectional elevation on the irregular line 18—18 of Fig. IV, showing details of the adjustable forward rollers and supports for the paper feed carrier. Fig. XIX is an enlarged detail right hand elevation view of the automatic clutch means for regulating and controlling and timing the movements of parts of my improved bread wrapping machine which control the folder mechanism and knotter. Fig. XX is a detail sectional plan view taken on irregular line 20—20 of Fig. XIX, showing details of construction in that behalf. Fig. XXI is an enlarged detail sectional elevation view taken on a line corresponding to line 21—21 of Fig. XX and XXIII. Fig. XXII is a detail view in side elevation of the plate 139, a part thereof being broken away to show the clutch member 144 and its coacting parts. Fig. XXIII is an enlarged detail sectional view taken on a line corresponding to line 23—23 of Figs. I, XIX and XXI. Fig. XXIV is an enlarged detail sectional plan taken on a line corresponding to line 24—24 of Figs. I and IV, showing details of the loaf shifting means for shifting the loaf through the folders to the knotter mechanism. Fig. XXV is an enlarged detail plan view of the cam means for shifting the loaf carrier from the primary end folders to the secondary end folders and thence to the knotter table and mechanism. Fig. XXVI is an enlarged detail end elevation view showing the position of the loaf and the arrangement of the parts as the loaf is elevated into the folder means, with the wrapper disposed over the top of the loaf. Fig. XXVII is an enlarged detail elevation view of the loaf when it is acted upon by the bottom and primary end folding means. Fig. XXVIII is an enlarged detail perspective view of the primary bottom and end folders, and their actuating means. Fig. XXIX is an enlarged detail plan view of the adjustable table and the bottom end folder wings. Fig. XXX is a detail sectional view on line 30—30 of Fig. XXIX, showing details of the construction and the adjustment and operation of the said folder table parts. Fig. XXXI is a detail sectional elevation view of the loaf after it has been shifted laterally into the secondary bottom and end folding means, and after the end has been folded up at the bottom and down at the top, the position of the upper folding blade 148 being indicated by dotted line. Fig. XXXII is a detail perspective of the end of a loaf showing the method of folding the wrapping paper 43 thereon. Fig. XXXIII is a detail elevation view of the electric motor drive with a chain of gears, which is oftentimes the preferred drive for a machine of this kind.

In the drawing, all of the sectional views are taken looking in the direction of the little arrows at the ends of the section lines, and similar numerals of reference refer to similar parts throughout the several views.

Considering the numerals of reference, my bread wrapping machine comprises a general framework supported by legs 1, 1 and having a series of horizontal frame parts, a bottom part 2, a middle frame part 3 and an upper frame part 4 on which the various parts of the machine are disposed and arranged to coöperate with each other. An end plate 5 is provided at the rear.

The machine is preferably driven by an electric motor 6 which may be provided with a shaft 7, a worm 8 and gear 9. The gear 9 is disposed upon the driven shaft 11 of the machine and these parts are inclosed in a casing 10, as clearly appears in Fig. V. However, for most purposes I have ascertained that the chain of gears illustrated in Fig. XXXIII, on account of its simplicity and because of the flexibility and slipping of the belt, will be preferred. The worm and worm gear are most economical. The train of spur gears, while they are somewhat more cumbersome, are found to work more satisfactorily under most conditions. The motor is disposed upon suitable brackets on the lower frame part 2. The sprocket wheel 12 is disposed on this driven shaft 11 and is connected by sprocket chain 13 to the sprocket wheel 14 on the shaft 15. See Figs. III and VI.

On the shaft 15 is an intermittent gear 16 which meshes with a corresponding intermittent gear 17 that drives the shaft 19, so that the shaft 19 is intermittently driven from the said gear 16. Sprocket wheels 18 are disposed on the shaft 19 and around these are disposed and arranged sprocket chains 20, 20, constituting with the cross bars 21, 21, the endless carrier for feeding the loaves of bread into the machine. The ends of the cross bars 21 project into the guide ways 27, 27 at each side and are supported by same. The chain 20 at the front of the machine is disposed around the sprocket wheel 22 on shaft 23 and is also arranged around the sprocket wheel 25 on the shaft 26 toward the rear part of the machine beneath the sprocket wheel 18. The guides 27 are supported by the braces 24 extending forwardly from the front part of the frame of the machine, and these two parts uniting form the support for the front sprockets 22 of the feeding carrier. A series of longitudinal slats 28 are disposed between guides 27 and supported by braces 24.

The intermittent gears 16 and 17 are adjustable in their relation to the loaf feed carrier. A hand-nut 19$^A$ is threaded on to the end of the shaft 19, see Figs. I, II, VI and IX. A disk 19$^B$ is movable longitudinally on said shaft 19 by means of a key 19$^C$, and is provided with an engaging pin 19$^D$ on its face. See Figs. VII and IX. The intermittent gear 17 is connected to a flange 17$^A$ by sleeve 17$^B$, which embraces the shaft 19. The outer part of the sleeve constitutes a journal running in a suitable bearing on the frame 3. A series of holes 17$^C$ correspond to the pin 19$^D$ on the disk 19$^B$. A retaining collar 17$^D$ is on the shaft 19 to properly locate the gear 17 and its sleeve. From this description it will be seen that by loosening the hand nut 19$^A$, the disk 19$^B$ can be withdrawn so that the pin 19$^D$ will disengage the flange 17$^A$, and the pin can be adjusted in any one of the series of holes 17$^C$. In doing this, of course, the relation of the shaft 19 to the intermittent gear 17 will be varied, so that the relative position of the loaf carrying slats will be varied and the position of the loaf in the machine can thus be regulated. The relation of these parts just described clearly appears in Figs. VI to X, inclusive.

Yielding guide arms 29, 29 for centering the loaf into the machine are supported upon vertical shafts 30, 30, secured to the frame at each side and are joined together by link 32 connected at pivot 31' on a rearwardly-projecting arm 31 and by pivot 31' on a forwardly-projecting arm 31 on the opposite side of the machine. Tension is put upon these parts by the spring 33 connected to the link 32. These parts clearly appear in Fig. XI. The loaf, when advanced by the carrier, will be engaged by the guide 29, 29 at each side and will be brought to the central line of travel.

When the loaf is delivered by the intermittent movement into the machine in position to be wrapped, it will be disposed directly above the elevator platform 34 which is carried upon the upper ends of a pair of rods 35. These rods are disposed in suitable vertical guides 36. The elevator is raised upwardly, carrying the loaf upwardly by means of the lever 38 which is fulcrumed at 39 and is connected by the link 37 to the pivot 37' just beneath the elevator platform. The short arm 40 of the lever carries the roller 41 which is acted upon by cam 42 which is disposed in proper timed relation upon the shaft 11. It will thus be seen that as the shaft 11 rotates it will elevate the loaf of bread upwardly into the folding device. The first step of the folding process is clearly indicated in Fig. XXVI, where the loaf has been carried upwardly on the elevator platform 34 between the side folders 86, 86, which will be hereafter described.

The wrapping paper 43 is carried on a roll 44 on a suitable shaft 45 at the rear of the machine, and is dropped downwardly into a loop around the idle roll 48, which is also a weight for regulating the tension, thence upwardly between the feed rolls 50, 52. The weighted roll 48 revolves on its axle 48', which is carried in suitable guides 49 that are disposed on vertical suspended guide rods 47, 47, see particularly Figs. I, III and IV. The roller and guide rods are carried by the rearwardly projecting bracket 46, secured to the end plate 5 of the machine. The feed roll 50 is carried upon the shaft 51 and coöperates with the upper feed roll 52 which is carried on the shaft 53, as clearly appears in Fig. IV. The paper is delivered forwardly through suitable guides 54 into the machine, the same being carried forward by a pair of endless belts 55 carried on the roller 56 on shaft 57 at one end and the pair of adjustable rolls 58 which are supported by the adjustable journal pins 59 on the other end. The front pins 59 are supported by the adjustable arms 60 which are carried on the underside of the adjustable folder table sections 146' by set screws 61.

A pulley 62, see Figs. III and VI, on the shaft 15 is connected by a round belt 63 to pulley 64 on the shaft 65. Shaft 65 is supported on the brackets 46 toward the rear of the machine. See Fig. III. This shaft 65 carries the pulley 66, which is connected by the belt 67 to drive the pulley 68, see Figs. I, XIII and XIV, on shaft 57. The roll 56 is on this shaft and is the rear part of the paper carrier.

An adjustable stop means is provided for locating the wrapping paper in the required position to receive the loaf of bread, and be acted upon by the folders. This clearly appears in Fig. XV, which is taken on section line 15—15 of Fig. I. The stop is carried on the sleeve 55$^B$ which is adjustable upon the rod 55$^C$ by means of the finger 55', which is adapted to engage notches 55$^A$. An inwardly-projecting arm 55$^D$ is connected by a flexible sheet of metal 55$^E$ to the cross bar 55$^F$, which carries downwardly-projecting stop pins 55$^G$ projecting downwardly through the slots 55$^H$. The paper passes above the guide plate 4$^A$, which is secured and supported in place by the cross bar 4$^B$ and passes beneath the plate 4$^C$ which is supported and retained in position by the cross bar 4$^D$, see particularly Figs. XV, XVI and XVII.

A plate 69 is disposed below the web of wrapping paper 43. A transverse knife 70 is above the same, being urged downwardly by the spring 76. The rock shaft 74 carrying arm 75 is connected to elevate the knife, as appears in Fig. I. These parts and the associated knife are held upwardly by trigger fingers 75', see Fig. I, which are actuated by suitable means, in suitably timed relation to each other, so that the knife snaps down and severs the paper at predetermined periods. These parts in detail are made the subject matter of an independent patent application, and therefore are not described more fully at this point. The sprocket wheel 79 on shaft 78 is driven by the sprocket chain 80 from the sprocket wheel 81 disposed on the shaft 15, as clearly appears in Fig. III. The clutch 82, which sets these parts in operation, is disposed on the shaft 51 and is controlled by the lever 83 which is connected by the connecting rod 84 to the trip arm 85, fulcrumed at 85' on the side of the frame and disposed to be acted on by each loaf as it is fed in. The paper feed and folder and knotter parts of the machine do not operate unless a loaf passes and trips this lever. The relation and arrangement of these parts appear by considering Figs. III and XI. The knife is timed and controlled by the cam 77 on the shaft 78, see Fig. XII. When the knife descends, it throws out the clutch 82 and stops the delivery of paper from the roll. This same cam also performs the further duty of throwing the folder and knotter mechanism into gear by controlling a suitable automatic clutch therefor. This clutch is so constructed that if a loaf is not delivered it will automatically be thrown out until a loaf is delivered into the machine, when the machine will be set in operation and will act upon the loaf as it progresses. This avoids both the waste of paper and of twine and prevents any loss or inconvenience from the failure of an operative to place a loaf on the loaf feeding carrier. A reference to Fig. XII shows that the cam 77 acts upon a roller 128 carried upon the arm or lever 127, which is pivoted or fulcrumed at 127'. A link 125, connected at 126 to the lever 127, connects to lever 130, see Fig. XIX. The link or connecting rod 125 is pivoted to the lever 130 at 129. The lever 130 is fulcrumed at 131, and is held yieldingly in position by the tension spring 130', see Fig. XIX. The details of this clutch appear in Figs. XIX to XXIII, inclusive. The relation of the parts to the knotter and folder cam appear from Fig. I. The said cam is driven by the sprocket wheel 124, see Fig. XXIII, by the sprocket chain 123 which extends upwardly, see Fig. I, and drives sprocket wheel 122 which is on the shaft 121', see Figs. I and II.

The sprocket wheel 124 is carried by the clutch member 138 to which it is keyed, the same being supported revolubly upon the shaft 11. The clutch member 141 is keyed to the shaft 11, see Figs. XXI and XXII. The clutch member 138 carries the pivoted jaw 142, which is pivoted at 144 and is held yieldingly inward by the blade spring 145 which is fulcrumed at 138', engaging a suitable notch 138^A in the clutch member at one end, and a suitable notch 142' on the dog 142 at the other end, as appears in Figs. XXI and XXII. The pivot dog 142 is provided with a laterally-projecting pin 143, see Figs. XIX, XXI and XXII. The controlling means for this clutch is carried on the bracket 135, see Figs. XIX and XX, secured to the side of the frame. A swinging arm 134 is loosely held on pivot 136 on the side bracket, and is held yieldingly against the bracket by the coiled spring 136' on said pin 136. A spring 137 connects the arm 134 to the frame 3 and urges the same laterally toward the engaging position, see Fig. XX. The free end of the arm 134 is beveled on its under side at 134', bringing it to a point where it rests upon the periphery of the clutch member 138. When the arm 130 rocks upon its pivot, the lower end thereof engages the end of the bell crank 132, which is pivoted at 133 on the bracket 135 and rocks the bell crank on its pivot so as to move the arm 134 to one side, to allow the jaw 142 to engage the clutch member 141.

A plate 139 is secured to the clutch member 138 and embraces and retains the clutch member 141 in its coöperative relation with the pivoted jaw 142 and the arm 134 to be actuated indirectly by the loaf which trips and starts the cycle of the machine, so that if no loaf is delivered by the intermittent movement of the loaf feeding means, no paper is fed, the folders do not operate and the tying devices are not set in motion.

The side folders 86, 86 of the loaf are disposed and carried on the downwardly-projecting arms at 87, 87, from the loaf shifter, being pivoted at 87', 87', at the lower ends of said arms. These downwardly depending arms 87, 87 are each carried by a cross bar 88, 88 of the laterally-shifting carrier frame of the loaf shifter. These are adjustable to and from each other by the right and left hand screw 96, which is journaled at 90', 90' in the end bars 90, 90 of said carrier or shifter. These are carried on parallel rod ways 91, 91, supported on the top of the machine in suitable clip supports 92, 92 on the cross bars 93. These parts are carried by the upright posts 94, 94 at each corner of the machine. The rods 91, 91 extend from the front end to the rear end of the machine, as clearly appears in Figs. IV and XXIV. Adjustable cross bars 88 are carried upon the longitudinal supporting rod ways 89, 89 and are adjustable by manipulation of the hand wheel 96', by which the right and left hand screw 96 is controlled and the position of said cross arms 88 is determined. The tops of the posts 94 are joined together by the longitudinal bars 95, which retain these parts rigidly in position.

The primary bottom folder 98 is carried on a suitable frame at the rear of the machine, and is adapted to reciprocate underneath the elevated loaf and fold the downwardly-depending portion of wrapper 43 underneath the same, as clearly appears in Figs. XXVI and XXVII. The downwardly extending portion appears in Fig. XXVI. This folder is carried by a suitable reciprocating plate 101 on suitable ways. Supported on this plate 101 are the primary end folders 97, carrying the pivoted parts 97', 97', see particularly Fig. XXVII. Rearwardly projecting arms 97^A extend from the said folder and are carried by a suitable transverse guide rod 100 which is supported in a suitable central bracket on the plate 101. These parts are adjusted to and from each other by the right and left hand screw 99, see particularly Fig. II. The movements of these parts are controlled by the lever 109, which is pivoted at 110' on the rearwardly extending arm 110. The lever is connected to link 111 by pivot 112 and the forward end of the link is connected by pivot 113 to the reciprocating plate 101. A rod 103 is connected at pivot 108 to the lever 109, see Figs. II and III, and is actuated by the cam 107 on the shaft 11. The rod is supported in position by the swinging arm or link 105, pivoted at 106 on the frame and carries a cam contact roller 104 at its upper end. The cam engages the roller and reciprocates the rod positively in the proper timed relation to make the primary bottom and end folds on the loaf. The plate 101 is carried on the rod ways 102, 102, see particularly Fig. XXVIII, where these parts are enlarged and shown in perspective, and are supported on an upwardly-projecting bracket 4' on the upper frame, the location of the bracket clearly appearing in Fig. I. The pivoted folders 97' are held yieldingly in place by the springs 97''', the same being pivoted at 97'', as clearly appears in said Fig. XXVIII. When the primary fold and end fold are thus made upon the loaf, the loaf is retained between the side folders 86, 86 and the loaf shifter carrying the side folders is shifted forwardly in the machine to form the secondary folds on the end of the loaf, as indicated in Fig. XXXI. Movement is imparted by the actuating arm 115, pivoted at 116 to the arm 114, connected at 114' to the rearward cross bar 90 of the said shifting frame. The actuating arm 115 is carried on the vertical rock shaft 117, and a short arm 118 of the said rock shaft is provided with a pin and roller 119, which cooperates with the cam 120 on the roller 121 toward the front of the machine. This is timed to shift the loaf forwardly in the machine at the proper time. The cam roll 121 is carried on the shaft 121', which is provided with sprocket wheel 125, and is suitably driven by sprocket chain 123 from sprocket wheel 124 of the automatic clutch on shaft 11.

When the primary bottom and end folds have been made, as specified, by the operation of the parts indicated, the loaf shifter carried at the top of the machine is actuated by the lever 115 and its connecting link 114, as specified, and the loaf is carried farther on to the central folding table 146 where the secondary end folders 147, see Fig. IV, contact with the loaf and make the secondary end folds. Upwardly curved deflecting folder wings 147', see in Figs. IV and XXIX fold the projecting bottom portion of these folds upwardly against the end of the loaf, and a downwardly-moving blade-like folder 148, pivoted at 148' and actuated by suitable connections, descends and folds the upper projecting portion downwardly so that a fold is formed exactly as appears in Fig. XXXII. That is, a fold in which top and bottom portions are shut against the end of the loaf, thus forming a complete closure at that point. The loaf is then further shifted by the loaf shifting means, carried at the top of the machine, forwardly, being engaged by the arms 87, 87, depending from said carrier, until the same is moved from the central folding table onto the knotter table 152. The knotter table 152 is carried upon suitable rod-ways 156 and 157, the same being provided with cross arms 155, as seen in Fig. IV. The central fixed table with its adjustable parts 146', 146', are adjustable to and from each other by the right and left hand screw 151, see Figs. XXIX and XXX, and the curved folder wings 147, 147 are on the outer portions, so they may be adjusted to the exact size of the loaf that is to be wrapped. These parts are supported in a fixed position on a pair of rods 150, 150, so they may be readily adjusted. See Figs. XXIX and XXX and Fig. IV, where the parts appear in sectional elevation. The paper is carried to the central position by the side guides 43^A as it is fed into the machine by the feeding bands or belts 55. When the loaf is delivered to the tying table 152 it is, by a suitable timed cam released and shifted laterally by the cam 161 engaging the projecting arm 162, the cam rod being provided with a stop 162' to limit the movement thereof and hold the same in a fixed position to permit the tying needle to wrap the thread about the same. The details of the needle 163 and its actuating means 164 clearly appear in Fig. III. These parts are not fully detailed here as they are made the subject of a special patent application.

The laterally-shifting carriage 152 is supported on a pair of rod-ways 156 and 157, and the loaf is shifted endwise into the knotter and when the same is timed, it is discharged by the kicker means 169', actuated by the link 169 which is thrown by the lever 170, which is fulcrumed at 170' and connected by a link 171 to a cam roller which is acted upon by the cam 172 carried on the shaft 78, as clearly appears in Fig. III. The loaf is ejected onto platform 173 between the side guards 174.

The carriage 152 is provided with adjustable guides 153, 153 at each end, the ends 155, 155 being adjustable to and from each other by a suitable screw means.

The sprocket 79 on shaft 78 is driven by the sprocket 80 and is coupled with the shaft 78 so as to drive the same when the rod 84 and the lever 83 are actuated by the loaf which is being carried into the machine. When the loaf engages the trip arm 85, it couples the sprocket 79 with the shaft 78 so as to drive the paper cutting mechanism and the same movement of the arm 83 throws in the clutch 82 so as to drive the shaft 51 to actuate the paper feed rolls. At the other end of shaft 78 is the cam 77 for actuating the paper knife which also actuates the rod 175 for controlling the clutch mechanism through which the cam roll 121 is driven. When a loaf of bread is started into the machine and engages the trip arm 85, the clutch mechanisms are actuated to throw into gear the paper cutting mechanism, the paper feeding mechanism and the cam roll for actuating various parts of the machine such as the loaf shifting mechanism, the mechanism for shifting the knotter table and for actuating the knotting needle. These connections form no part of my invention as they are shown in my co-pending application Serial No. 801,268, filed Nov. 15, 1913. The parts are so timed that when the folding operations are completed, the knotter table 152 is in position so that the loaf is shifted from the table 146 to the knotter table 152 and the movement of the knotter table carries the loaf from between the folders 86 to complete the knotting operation.

The details of this structure can be greatly varied without departing from my invention. I have, however, embodied the same in a very satisfactory and effective form, and I desire to claim the structure specifically, so far as possible, and also to claim the invention broadly as clearly appears from the appended claims.

Having thus described my invention, what I claim as new and desire to secure by Letters Patent is:

1. In a bread wrapping machine, the combination with a suitable framework, of an endless loaf feed conveyer with transverse slats thereon for engaging loaves of bread; a yielding loaf operated trip to be acted upon by the loaf; a wrapper paper feed device comprising a roller, a tensioning device and an automatic cut-off; a clutch for actuating the said paper feed and cut-off; a connection from the clutch to the loaf operated trip whereby the paper feed device is released by the action of the loaf; a cam for controlling said paper feed and cut-off means; a suitable endless conveyer for conveying the cut-off wrapper paper into the machine; stop means for locating it in proper position; an elevator with a platform for receiving the loaf as it is advanced intermittently by the loaf feeding carrier; a cam means upon the driven shaft of the machine connected and timed for elevating the loaf against the wrapper; a loaf shifting carrier at the top of the machine, with downwardly depending arms and pivoted side folders for receiving the upwardly moving loaf and folding the wrapper down to the sides thereof; folding means for wrapping the paper around the loaf; a knotter carriage disposed in proximity to the folder table and coöperating with the loaf shifter carrier to receive the loaf; a cam roll with suitable connection to the said loaf shifting carriage at the top of the machine for carrying the loaf from the initial position in the folder to the carriage of the knotter; a suitable projection on the said knotter carriage coöperating with said cam roll; knotter means for tying a cord on said loaf; suitable ejector means for ejecting the loaf from the said carriage, timed to coöperate on the completion of the knotting; an automatic clutch for driving said folders and knotters; connections therefrom to the paper feed cam, all coacting substantially as described and for the purpose specified.

2. In a bread wrapping machine, the combination with a suitable framework, of an endless loaf feed conveyer with transverse slats thereon for engaging loaves of bread; a yielding loaf operating trip to be acted upon by the loaf, a wrapper paper feed device; a clutch for actuating the said paper feed; a connection from the clutch to the loaf operated trip whereby the paper feed device is released by the action of the loaf; a cam for controlling said paper feed; a suitable endless conveyer for conveying the wrapper paper into the machine; stop means for locating it in proper position; an elevator with a platform for receiving the loaf as it is advanced intermittently by the loaf feeding carrier; a cam means upon the driven shaft of the machine connected and timed for elevating the loaf against the wrapper; a loaf shifting carrier at the top of the machine, with downwardly depending arms and pivoted side folders for receiving the upwardly moving loaf and folding the wrapper down to the sides thereof; folding means for wrapping the paper around the loaf; a knotter carriage disposed in proximity to the folder table and coöperating with the loaf shifter carrier to receive the loaf; a cam roll with suitable connection to the said loaf shifting carriage at the top of the machine for carrying the loaf from the initial position in the folder to the carriage of the knotter; a suitable projection on the said knotter carriage coöperating with said cam roll; knotter means for tying a cord on said loaf; suitable ejector means for ejecting the loaf from the said carriage, timed to coöperate on the completion of the knotting; an automatic clutch for driving said folders and knotters; connections therefrom to the paper feed cam, all coacting substantially as described and for the purpose specified.

3. In a bread wrapping machine, the combination with a suitable framework, of an endless loaf feed conveyer with transverse slats thereon for engaging loaves of bread; a yielding loaf operating trip to be acted upon by the loaf, a wrapper paper feed device; a clutch for actuating the said paper feed; a connection from the clutch to the loaf operated trip whereby the paper feed device is released by the action of the loaf; a cam for controlling said paper feed; a suitable endless conveyer for conveying the wrapper paper into the machine; stop means for locating it in proper position; an elevator with a platform for receiving the loaf as it is advanced intermittently by the loaf feeding carrier; a cam means upon the driven shaft of the machine connected and timed for elevating the loaf against the wrapper; a loaf shifting carrier at the top of the machine, with downwardly depending arms and pivoted side folders for receiving the upwardly moving loaf and folding the wrapper down to the sides thereof; folding means for wrapping the paper around the loaf; a cam roll with suitable connection to the said loaf shifting carriage at the top of the machine for carrying the loaf through the folder; an automatic clutch for driving said folder; and connections therefrom to the paper cam, all coacting substantially as described and for the purpose specified.

4. In a bread wrapping machine, the combination with a suitable framework, of an endless loaf feed conveyer with transverse slats thereon for engaging loaves of bread; a yielding loaf operated trip to be acted upon by the loaf; a wrapper paper feed device comprising a roller, a tensioning device and an automatic cut-off; a clutch for operating the said paper feed; a connection from the clutch to the loaf operated trip whereby the paper feed device is released by the action of the loaf; a cam for controlling said paper feed and cut-off means; a suitable endless conveyer for conveying the cut-off wrapper paper into the machine; stop means for locating it in proper position; an elevator with a platform for receiving the loaf as it is advanced intermittently by the loaf feeding carrier; a means connected and timed for elevating the loaf against the wrapper; a loaf shifting carrier at the top of the machine, with downwardly depending arms and pivoted side folders for receiving the upwardly moving loaf and folding the wrapper down to the sides thereof; folding means for wrapping the paper around the loaf; a knotter carriage disposed in proximity to the folder table and coöperating with the loaf shifter carrier to receive the loaf; a cam roll with suitable connection to the said loaf shifting carriage at the top of the machine for carrying the loaf from the initial position in the folder to the carriage of the knotter; a suitable projection on the said knotter carriage coöperating with said cam roll; knotter means for tying a cord on said loaf; suitable ejector means for ejecting the loaf from the said carriage, timed to coöperate on the completion of the knotting; an automatic clutch for driving said folders and knotters; connections therefrom to the paper feed cam, all coacting substantially as described and for the purpose specified.

5. In a bread wrapping machine, the combination with a suitable framework, of an endless feed conveyer with transverse slats thereon for engaging loaves of bread; a yielding loaf operating trip to be acted upon by the loaf, a wrapper paper feed device; a clutch for actuating the said paper feed; a connection from the clutch to the loaf operated trip whereby the paper feed device is released by the action of the loaf; a cam for controlling said paper feed; a suitable endless conveyer for conveying the wrapper paper into the machine; stop means for locating it in proper position; an elevator with a platform for receiving the loaf as it is advanced intermittently by the loaf feeding carrier; a means connected and timed for elevating the loaf against the wrapper; a loaf shifting carrier at the top of the machine, with downwardly depending arms and pivoted side folders for receiving the upwardly moving loaf and folding the wrapper down to the sides thereof; folding means for wrapping the paper around the loaf; a knotter carriage disposed in proximity to the folder table and coöperating with the loaf shifter carrier to receive the loaf; a cam roll with suitable connection to the said loaf shifting carriage at the top of the machine for carrying the loaf from the initial position in the folder to the carriage of the knotter; a suitable projection on the said knotter carriage coöperating with said cam roll; knotter means for tying a cord on said loaf; suitable ejector means for ejecting the loaf from the said carriage, timed to coöperate on the completion of the knotting; an automatic clutch for driving said folders and knotters; connections therefrom to the paper feed cam, all coacting substantially as described and for the purpose specified.

6. In a bread wrapping machine, the combination with a suitable framework, of an endless loaf feed conveyer with transverse slats thereon for engaging loaves of bread; a yielding loaf operating trip to be acted upon by the loaf, a wrapper paper feed device; a clutch for actuating the said paper feed; a connection from the clutch to the loaf operated trip whereby the paper feed device is released by the action of the loaf; a cam for controlling said paper feed, a suitable endless conveyer for conveying the wrapper paper into the machine; stop means for locating it in proper position; an elevator with a platform for receiving the loaf as it is advanced intermittently by the loaf feeding carrier; a means connected and timed for elevating the loaf against the wrapper; a loaf shifting carrier at the top of the machine, with downwardly depending arms and pivoted side folders for receiving the upwardly moving loaf and folding the wrapper down to the sides thereof; folding means for wrapping the paper around the loaf; a cam roll with suitable connection to the said loaf shifting carriage at the top of the machine for carrying the loaf through the folder; an automatic clutch for driving said folder; and connections therefrom to the paper cam, all coacting substantially as described and for the purpose specified.

7. In a bread wrapping machine, the combination of a suitable endless bread carrier with cross slats; yielding oblique guides on opposite sides of the bread carrier, disposed to center the loaf upon the carrier, paper feed means for delivering a paper wrapper for wrapping the said loaves, and a yielding trip disposed above the said loaf feeding carrier to be actuated by the loaf to release the paper feed device and deliver paper into the machine, as specified.

8. In a bread wrapping machine, the combination of a suitable endless conveyer for carrying the loaves into the machine, a trip means disposed in the path of said conveyer in position to be acted upon by the loaf, paper feed means and loaf shifting means released by the said trip to deliver paper into the machine and to wrap the paper around the loaf, all coacting substantially as described and for the purpose specified.

9. In a bread wrapping machine, the combination of a suitable endless conveyer for delivering the loaf into the machine, means for delivering the paper wrapper into the machine, a trip means disposed in the path of said conveyer to be actuated by the loaf for releasing the paper feed device, a cam means for controlling the paper feed device, a folder means and a loaf shifting means and a trip actuated by the same cam means for throwing the folder means into gear, all coacting substantially as described and for the purpose specified.

10. In a loaf wrapping machine, a loaf feeding carrier, a paper feed means, a knotter means, a trip disposed to be acted upon by a loaf when fed by the carrier for throwing the paper feed into gear, and a trip acted upon by the paper feed to throw the knotter means into gear, coacting as specified.

11. In a bread wrapping machine, the combination of a loaf feed carrier, a trip disposed to be acted upon by the loaf, paper feed and cut-off mechanism, connections to the trip to throw the paper feed into gear by the action of the loaf, folder means and knotter means, clutch devices for throwing the folder and knotter means into gear, and a trip disposed to be actuated by the paper feed means to throw the said folder and knotter means into gear, whereby each loaf delivered into the machine will be acted upon successively by the said devices and the paper feed and knotter means will remain inoperative except when a loaf is delivered, coacting as specified.

12. In a bread wrapping machine, the combination of a suitable bread feeding conveyer, a paper feed and cut-off actuated therefrom, endless bands for delivering the wrapper into the machine with side guides therefor, and adjustable stops for locating the wrapper in proper position, coacting as specified.

13. In a bread wrapping machine, the combination of a suitable bread feeding conveyer, a paper feed and cut-off actuated therefrom, endless bands for delivering the wrapper into the machine with side guides therefor, and adjustable stops for locating the wrapper in proper position, comprising an arm carried thereby, downwardly-projecting pins from the said arm to contact with the paper, a pivoted lever, and a notched bar for retaining the same in position, coacting as specified.

14. In a bread wrapping machine, the combination of a suitable elevator for elevating the loaf into contact with a sheet of paper, a reciprocating loaf shifting carriage, folders carried thereby for retaining the wrapper upon the top of the loaf, a reciprocating carriage carrying a primary bottom and pivoted end folders disposed to fold the wrapper onto the loaf, a folder table with secondary end folders to receive the loaf as it is shifted and fold the second part of said end and bottom folds, curved wings for folding the bottom flap of the end folds, and downwardly-moving blades for folding the top flap of the end fold, a lateral carrier to deliver the loaf to a knotter, and means for shifting the loaf to said lateral carrier to deliver the same to a knotter, coacting for the purpose specified.

15. In a bread wrapping machine, the combination of a suitable carrier, paper feed devices, trip devices coöperating with the said paper feed device, folder and knotter devices, a clutch means for controlling the said folder and knotter devices comprising a rotatable disk member on the said shaft carrying a suitable dog with a spring for forcing the same inwardly into engaging position and provided with a laterally projecting pin, a coöperating arm loosely pivoted so that it can be swung to one side of said clutch member, the outer part of said member containing a depressed portion to permit the said arm to swing into engaging position, the outer end of said arm being wedge shaped for engaging under the said pin, an internal member keyed to the driving shaft suitably notched to receive the tooth of said external member, a trip means connected to said paper feed for throwing the said clutch into gear and permitting the same to be disengaged when the paper feed is not operated, coacting as specified.

16. In a bread wrapping machine, the combination of a suitable carrier, paper feed device, trip devices coöperating with the said paper feed device, folder and knotter devices, a clutch means for controlling the said folder and knotter devices comprising a rotatable disk member on the said shaft carrying a suitable dog with a spring for forcing the same inwardly into engaging position and provided with a laterally projecting pin, a coöperating arm loosely pivoted so that it can be swung to one side of said clutch member, the outer part of said member containing a depressed portion to permit the said arm to swing into engaging position, the outer end of said arm being wedge shaped for engaging under the said pin, an internal member keyed to the driving shaft suitably notched to receive the tooth of the said external member, and a trip means for throwing the said clutch into gear and permitting the same to be disengaged, coacting as specified.

17. In a bread wrapping machine, the combination of a loaf shifter with coöperating folding devices and a knotting device and a laterally moving carriage for the said loaf after the same is received for delivering it to a knotting device, and a roll cam disposed to be attached by suitable clutch means with connections to a lever for shifting the said loaf shifter, and with connections to a projecting part for actuating the knotter carriage, coöperating for the purpose specified.

In witness whereof, I have hereunto set my hand and seal in the presence of two witnesses.

ROBERT J. SEATOR. [L. S.]

Witnesses:
 WALTER S. POWERS,
 EDWARD D. STRAIN.